(12) United States Patent
Abe

(10) Patent No.: US 12,270,634 B2
(45) Date of Patent: Apr. 8, 2025

(54) MEASUREMENT DEVICE, INFORMATION PROCESSING DEVICE, POSITION ADJUSTMENT METHOD, AND COMPUTER-READABLE MEDIUM

(71) Applicant: NEC Corporation, Tokyo (JP)

(72) Inventor: Jiro Abe, Tokyo (JP)

(73) Assignee: NEC CORPORATION, Tokyo (JP)

( * ) Notice: Subject to any disclaimer, the term of this patent is extended or adjusted under 35 U.S.C. 154(b) by 202 days.

(21) Appl. No.: 18/026,026

(22) PCT Filed: Sep. 28, 2020

(86) PCT No.: PCT/JP2020/036507
§ 371 (c)(1),
(2) Date: Mar. 13, 2023

(87) PCT Pub. No.: WO2022/064665
PCT Pub. Date: Mar. 31, 2022

(65) Prior Publication Data
US 2023/0358528 A1    Nov. 9, 2023

(51) Int. Cl.
*G01B 11/00* (2006.01)
*G01B 11/03* (2006.01)

(52) U.S. Cl.
CPC ............ *G01B 11/002* (2013.01); *G01B 11/03* (2013.01)

(58) Field of Classification Search
CPC ......... G01B 11/002; G01B 11/03; G06T 1/00; G01S 17/89; G01S 7/4808; G01S 7/4972
See application file for complete search history.

(56) References Cited

U.S. PATENT DOCUMENTS

| 2016/0187130 A1 | 6/2016 | Metzler et al. |
| 2019/0188872 A1 | 6/2019 | Aflalo et al. |
| 2021/0056716 A1* | 2/2021 | Mörwald ............. G01C 15/002 |

FOREIGN PATENT DOCUMENTS

| JP | 2011-099742 A | 5/2011 |
| JP | 2016-045330 A | 4/2016 |
| JP | 2018-159693 A | 10/2018 |
| WO | 2012/176249 A1 | 12/2012 |

OTHER PUBLICATIONS

International Search Report for PCT Application No. PCT/JP2020/036507, mailed on Oct. 27, 2020.
Armesto, Leopoldo et al., "A generalization of the Metric-Based Iterative Closest Point Technique for 3D Scan Matching", 2010 IEEE International Conference on Robotics and Automation, 2010, pp. 1367-1372, DOI:10.1109/ROBOT.2010.5509371.

* cited by examiner

*Primary Examiner* — Peter B Kim
(74) *Attorney, Agent, or Firm* — Sughrue Mion, PLLC

(57) ABSTRACT

A measurement device acquires first point cloud data at a first measurement position and second point cloud data at a second measurement position; determines a rotation axis for positional adjustment; determines, based on the rotation axis, the first point cloud data, and the second point cloud data, an evaluation function indicating a region that is a union set of one or more columnar bodies as an evaluation function representing desirability of a positional adjustment result; and calculates a positional adjustment parameter that optimizes the evaluation function based on the rotation axis, the first point cloud data, and the second point cloud data.

4 Claims, 6 Drawing Sheets

MEASUREMENT DEVICE, INFORMATION PROCESSING DEVICE, POSITION ADJUSTMENT METHOD, AND COMPUTER-READABLE MEDIUM

This application is a National Stage Entry of PCT/JP2020/036507 filed on Sep. 28, 2020, the contents of all of which are incorporated herein by reference, in their entirety.

TECHNICAL FIELD

The present invention relates to a measurement device, an information processing device, a position adjustment method, and a computer-readable medium.

BACKGROUND ART

Technologies for positionally adjusting multiple groups of point cloud data in three-dimensional space have been proposed.

For example, the information processing device described in Patent Document 1 aligns the heights of a first plane extracted from first point cloud data and a second plane extracted from second point cloud data by correcting the height of the second plane and specifying the height of the plane. This information processing device specifies the height of the plane and specifies an offset amount used for correction for each combination of multiple planes extracted from each of the first point cloud data and the second point cloud data.

CITATION LIST

Patent Literature

[Patent Document 1] JP 2018-159693 A

SUMMARY OF THE INVENTION

Problems to be Solved by the Invention

When positionally adjusting multiple groups of point cloud data, there are cases in which, in accordance with the point cloud data measurement method, disparities occur between differences in data between point clouds in the rotation axis directions of measurement devices and differences in data between point clouds in directions perpendicular to the rotation axis. For example, there may be cases in which the difference in the rotation axis direction is a few meters, yet the difference in the directions perpendicular to the rotation axis direction is a few hundred meters.

It is expected that positional adjustment will be able to be efficiently performed by performing positional adjustment by making use of these disparities.

One sample object of the present invention is to provide a measurement device, an information processing device, a position adjustment method, and a computer-readable medium that can solve the above-mentioned problem.

Means for Solving the Problems

A measurement device according to a first embodiment disclosed herein includes point cloud data acquiring means for acquiring first point cloud data at a first measurement position and second point cloud data at a second measurement position; rotation axis determining means for determining a rotation axis for positional adjustment; evaluation function determining means for determining, based on the rotation axis determined by the rotation axis determining means, the first point cloud data acquired by the point cloud data acquiring means, and the second point cloud data acquired by the point cloud data acquiring means, an evaluation function indicating a region that is a union set of one or more columnar bodies as an evaluation function representing desirability of a positional adjustment result; and positional adjustment computing means for calculating a positional adjustment parameter that optimizes the evaluation function based on the rotation axis determined by the rotation axis determining means, the first point cloud data acquired by the point cloud data acquiring means, and the second point cloud data acquired by the point cloud data acquiring means.

An information processing device according to a second embodiment disclosed herein comprises: communicating means for receiving point group data acquired by each of multiple measurement devices; point cloud data retaining means for retaining first point cloud data received from a first measurement device and second point cloud data received from a second measurement device; rotation axis determining means for determining a rotation axis for positional adjustment; evaluation function determining means for determining, based on the rotation axis determined by the rotation axis determining means, the first point cloud data retained by the point cloud data retaining means, and the second point cloud data retained by the point cloud data retaining means, an evaluation function indicating a region that is a union set of one or more columnar bodies as an evaluation function representing desirability of a positional adjustment result; and positional adjustment computing means for calculating a positional adjustment parameter that optimizes the evaluation function based on the rotation axis determined by the rotation axis determining means, the first point cloud data retained by the point cloud data retaining means, and the second point cloud data retained by the point cloud data retaining means.

A position adjustment method according to a third embodiment disclosed herein involves determining a rotation axis for positional adjustment of first point cloud data and second point cloud data; determining, based on the rotation axis, the first point cloud data, and the second point cloud data, an evaluation function indicating a region that is a union set of one or more columnar bodies as an evaluation function representing desirability of a positional adjustment result; and performing a positional adjustment computation for calculating a positional adjustment parameter that optimizes the evaluation function based on the rotation axis, the first point cloud data, and the second point cloud data.

A computer-readable medium according to a fourth embodiment disclosed herein contains a program for making a computer execute a process of reading out first point cloud data and second point cloud data; determining a rotation axis for positional adjustment; determining, based on the rotation axis, the first point cloud data, and the second point cloud data, an evaluation function indicating a region that is a union set of one or more columnar bodies as an evaluation function representing desirability of a positional adjustment result; and performing a positional adjustment computation for calculating a positional adjustment parameter that optimizes the evaluation function based on the rotation axis, the first point cloud data, and the second point cloud data.

Advantageous Effects of Invention

According to the measurement device, the information processing device, the position adjustment method, and the computer-readable medium as disclosed herein, when performing positional adjustment of multiple groups of point cloud data, the positional adjustment can be performed by making use of disparities between differences in data between point clouds in the rotation axis directions of measurement devices and differences in data between point clouds in directions perpendicular to the rotation axis.

EXAMPLE EMBODIMENT

Hereinafter, example embodiments of the present invention will be explained. However, the example embodiments below should not be construed as limiting the invention as claimed. Additionally, not all combinations of the characteristics described among the example embodiments are necessarily essential for the solution provided by the invention.

First Example Embodiment

Figure 1:
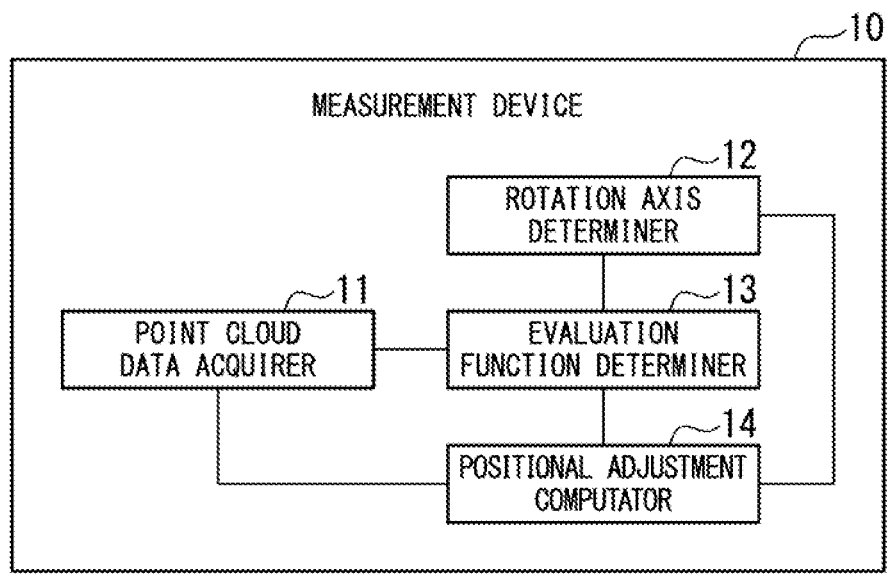
FIG. 1 is a diagram depicting an example of a configuration of a measurement device according to a first example embodiment.

FIG. 1 is a diagram depicting an example of a configuration of a measurement device according to a first example embodiment. The measurement device 10 depicted in FIG. 1 may be a computer device that operates by a processor executing a program stored in memory.

In the configuration depicted in FIG. 1, the measurement device 10 is provided with a point cloud data acquirer 11, a rotation axis determiner 12, an evaluation function determiner 13, and a positional adjustment computator 14. The point cloud data acquirer 11, the rotation axis determiner 12, the evaluation function determiner 13, and the positional adjustment computator 14 may be software or modules by which processes are executed by a processor executing a program stored in memory. Alternatively, the point cloud data acquirer 11, the rotation axis determiner 12, the evaluation function determiner 13, and the positional adjustment computator 14 may be hardware such as circuits or chips.

The functions and operations of the point cloud data acquirer 11 will be explained. The point cloud data acquirer 11 acquires point cloud data that is to be combined by positional adjustment. The point cloud data acquirer 11 corresponds to an example of point cloud data acquiring means.

The point cloud data acquirer 11 acquires first point cloud data at a first measurement position and second point cloud data at a second measurement position, which are to be combined by the positional adjustment. The point cloud data is data representing three-dimensional information in real space, in sets composed of multiple three-dimensional points. The three-dimensional points are data holding coordinate data in three-dimensional space. The coordinate data need only be data representing positions in three-dimensional space, and is not limited to anything specific. The coordinate data in three-dimensional space may, for example, be expressed in an orthogonal coordinate system, or may be expressed in a polar coordinate system.

The three-dimensional points may hold additional information aside from coordinate data in three-dimensional space. The additional information need only be information describing characteristics of a real-world object represented by the three-dimensional points, and is not limited to anything specific. The additional information may, for example, include color information and may include characteristic amounts representing local shape characteristics. As will be mentioned below, the additional information may be referenced by the evaluation function determiner 13 in order to map three-dimensional points representing the same position in the real world to each other when the evaluation function determiner 13 maps the three-dimensional points to each other.

The method by which the point cloud data acquirer 11 acquires point cloud data need only be a method allowing points that can be plotted on coordinates to be acquired, and is not limited to anything specific.

The point cloud data acquirer 11 may use LiDAR (Light Detection And Ranging) to acquire the point cloud data. In LiDAR, a LiDAR device emits light, and the reflected light obtained when the emitted light hits an object is received by the LiDAR device. In LiDAR, the distance from a LiDAR device to an object is measured based on the speed of light and the time from emission to reception. When the point cloud data acquirer 11 acquires point cloud data by means of LiDAR, the additional information held by the three-dimensional points may include information representing characteristics of the reflected light that has been received. The additional information may, for example, include a reflection intensity representing the intensity of reflected light that has been received, or may include phase information regarding the reflected light that has been received.

Alternatively, the point cloud data acquirer 11 may acquire the point cloud data by using radar. Alternatively, the point cloud data acquirer 11 may acquire the point cloud data based on surface data representing surface information regarding objects. The surface data may, for example, be three-dimensional data constructed from multiple sets of image data from different viewpoints by using SfM (Structured from Motion). The point cloud data acquirer 11 may acquire the point cloud data by sampling multiple three-dimensional points from surface information represented by the surface data.

In this way, various methods by which coordinate data regarding points in three-dimensional space can be acquired may be used as methods for the point cloud data acquirer 11 to acquire point cloud data.

Alternatively, the point cloud data acquirer 11 may receive point cloud data acquired in another measurement device from the other measurement device via a wireless communication channel or a wired communication channel. Wireless communication may, for example, be communication using a wireless communication standard defined as 5G in LTE (Long Term Evolution, LTE is a registered trademark) or 3GPP (3rd Generation Partnership Project). Alternatively, the wireless communication may be over a wireless LAN (Local Area Network), or may be short-range wireless communication such as infrared communication, Bluetooth (registered trademark), or the like. Wired communication channels may involve communication using optical communication lines or Ethernet (registered trademark).

The point cloud data acquirer 11 has preprocessing means for correcting inclinations of point cloud data caused by inclinations of the measurement devices at the time the point cloud data was acquired. The preprocessing means need only be means by which the first point cloud data and the second point cloud data can be converted to two groups of point cloud data that can be positionally adjusted by determining a rotation axis, and is not limited to anything specific. The preprocessing means may be means for aligning the inclinations of the acquired point cloud data. The preprocessing means may, for example, be an clinometer provided on the point cloud data acquirer 11. Alternatively, the preprocessing means of the point cloud data acquirer 11 may be means for calculating inclination values from three-dimensional points representing the ground surface, included in acquired point cloud data. In this case, the preprocessing means may acquire a first inclination value at the first measurement position and a second inclination value at the second measurement position. The preprocessing means can correct the coordinate system of the three-dimensional space to which the three-dimensional points included in the first point cloud data and the second point cloud data belong based on the difference between the first inclination value and the second inclination value. Alternatively, the preprocessing means may be means for outputting inclination information to the user. In this case, the preprocessing means can aid the user in aligning the inclinations of the measurement devices at the first measurement position and the second measurement position. The means for outputting the inclination information to the user may, for example, be a level. Alternatively, the preprocessing means may be means for holding the inclinations of the measurement devices 10 fixed.

As mentioned above, the point cloud data acquirer 11 can acquire first point cloud data at a first measurement position and second point cloud data at a second measurement position. Furthermore, the point cloud data acquirer 11 can correct inclinations of the point cloud data by the preprocessing means. Therefore, the point cloud data acquirer 11 can acquire two groups of point cloud data that can be positionally adjusted by specifying a rotation axis.

Next, the functions and operations of the rotation axis determiner 12 will be explained. The rotation axis determiner 12 determines a rotation axis so that the first point cloud data and the second point cloud data can be combined by positional adjustment based on their rotation axes. The rotation axis is a straight line in three-dimensional space.

In the positional adjustment performed by the measurement device 10, two conversions, i.e. a translational movement conversion in three-dimensional space and a rotational conversion about the rotation axis, are performed on the first point cloud data.

The rotation axis determiner 12 corresponds to an example of rotation axis determining means.

The rotation axis used for positional adjustment in this case is, for example, a straight line in the vertical direction. In the case in which the preprocessing means in the point cloud data acquirer 11 is means by which a specific coordinate axis direction is aligned with the vertical direction, that specific coordinate axis direction may be the rotation axis direction. The position of the rotation axis is not limited to anything specific. The rotation axis may be a straight line passing through the origin of the first point cloud data, or may be a straight line passing through the center of gravity of the first point cloud data.

As explained above, the rotation axis determiner 12 can determine a straight line that is to be a rotation axis for combining first point cloud data and second point cloud data by positional adjustment.

Next, the functions and the operations of the evaluation function determiner 13 will be explained. The evaluation function determiner 13 determines an evaluation function for measuring the desirability of positional adjustment parameters based on the rotation axis, the first point cloud data, and the second point cloud data. In this case, the positional adjustment parameters are information specifying translational movement conversion and rotational conversion for positional adjustment. The positional adjustment parameters may, for example, be a set of a linear movement amount representing translational movement in a one-dimensional direction along the rotation axis, a horizontal movement amount representing translational movement in a two-dimensional direction perpendicular to the rotation axis, and a rotation amount representing a rotation angle about the rotation axis of the rotational conversion.

The evaluation function determiner 13 corresponds to an example of evaluation function determining means.

Alternatively, the positional adjustment parameters need only be amounts that can be converted to and from sets of a linear movement amount, a horizontal movement amount and a rotation amount, and is not limited to anything specific. The positional adjustment parameters may be sets of a rotation amount and a translational movement amount. The translational movement amount is an amount representing three-dimensional movement combining movement along the rotation axis, represented by the linear movement amount, and movement perpendicular to the rotation axis, represented by the horizontal movement amount. Alternatively, the positional adjustment parameters may be matrices specifying translational movement conversion and rotational conversion.

The evaluation function determiner 13 implements mapping between three-dimensional points included in the first point cloud data and three-dimensional points included in the second point cloud data. Mapping is a process enabling three-dimensional points in point cloud data to be identified by assigning numbers thereto. For example, the evaluation function determiner 13, for multiple indices i, selects one three-dimensional point from the first point cloud data and assigns the index i thereto. Furthermore, the evaluation function determiner 13 selects one three-dimensional point from the second point cloud data and assigns the index i thereto. As a result thereof, the evaluation function determiner 13 maps a three-dimensional point included in the first point cloud data to a three-dimensional point included in the second point cloud data.

The i-th three-dimensional point selected from the first point cloud data may also be referred to as the i-th first point cloud data point. The i-th three-dimensional point selected from the second point cloud data may also be referred to as the i-th second point cloud data point. The evaluation function determiner 13 may assign multiple numbers to a single three-dimensional point in the mapping. That is, the evaluation function determiner 13 may select each of the three-dimensional points included in the first point cloud data by means of multiple indices, and may select each of the three-dimensional points included in the second point cloud data by means of multiple indices. That is, for an index $i_1$ and an index $i_2$, which are different, the same three-dimensional point may be selected as the $i_1$-th first point cloud data point and the $i_2$-th first point cloud data point.

Similarly, regarding an index $i_1$ and an index $i_2$, which are different, the same three-dimensional point may be selected as the $i_1$-th second point cloud data point and the $i_2$-th second point cloud data point. The first point cloud data and the second point cloud data may include three-dimensional points that are not mapped by the evaluation function determiner 13. That is, there is no need for the evaluation function determiner 13 to assign numbers to all of the three-dimensional points.

The evaluation function determiner 13, during the mapping, assigns the same number to two three-dimensional points that are expected to be at a close distance after positional adjustment. The evaluation function determiner 13 may also implement the mapping based on the additional information regarding the three-dimensional points. The evaluation function determiner 13 may, for example, implement the mapping by assigning the same number to a three-dimensional point included in the first point cloud data and a three-dimensional point included in the second point cloud data at which the additional information is similar by a prescribed condition or greater. Alternatively, the evaluation function determiner 13 may implement the mapping without referencing the three-dimensional point information. The evaluation function determiner 13 may, for example, map all of the three-dimensional points included in the second point cloud data, respectively, to all of three-dimensional points included in the first point cloud data.

The evaluation function determined by the evaluation function determiner 13 is a function that outputs values based on whether, for multiple indices i, the i-th first point cloud data point converted by positional adjustment specified by positional adjustment parameters is contained within an i-th tolerance region. The i-th tolerance region is a three-dimensional region. The i-th tolerance region may, for example, be a region formed by a set of three-dimensional points composed of points that are sufficiently close to i-th second point cloud data points. In this case, the evaluation function determined by the evaluation function determiner 13 can be considered to be a function for outputting values based on whether an i-th first point cloud data point that has been converted by positional adjustment is sufficiently close to an i-th second point cloud data point.

Being sufficiently close, as mentioned here, may mean that the distance is a prescribed threshold value or less. The i-th tolerance region may be a sub-region of a region in which the distance from the i-th second point cloud data point is a prescribed threshold value or less.

Alternatively, the i-th tolerance region may be a region that is considered to be desirable as a destination to which the i-th first point cloud data point is to be moved by positional adjustment, and is not limited to anything specific. The i-th tolerance region may be a set of three-dimensional points composed of points sufficiently close to the i-th second data cloud data point while maintaining a certain minimum distance from the i-th second data cloud data point. In this case, the evaluation function determined by the evaluation function determiner 13 may be described as a function that outputs values based on whether an i-th first data cloud data point converted by positional adjustment is sufficiently close to an i-th second point cloud data point while maintaining a certain minimum distance from the i-th second point cloud data point.

Such i-th tolerance regions are effective, for example, in the case in which the i-th first point cloud data point and the i-th second point cloud data point represent different surfaces on a flat object having a certain thickness. This is because, after the point group data has been correctly combined, the i-th first point cloud data point and the i-th second point cloud data point can be expected to be separated by the thickness of the flat object. In this case, the certain minimum distance may be a constant that is based on the thickness of the flat object.

Suppose that the i-th tolerance region is a piecewise columnar body. The piecewise columnar body is a union set of at least one columnar body. The columnar body is a three-dimensional shape having two congruent two-dimensional shapes that are perpendicular to the rotation axis as bottom surfaces. Furthermore, the bottom surfaces of the columnar body and the side surfaces of the columnar body are orthogonal. The columnar body is not limited to anything specific. The columnar body may, for example, be a cylinder, a triangular columnar body, or a rectangular columnar body. Additionally, the columnar body may have shapes having holes as the bottom surfaces, such as the difference set between two concentric circles having different radii. Additionally, the columnar bodies may have disconnected shapes as the bottom surfaces, such as the union set of two two-dimensional shapes not having any parts in common.

Figure 2:
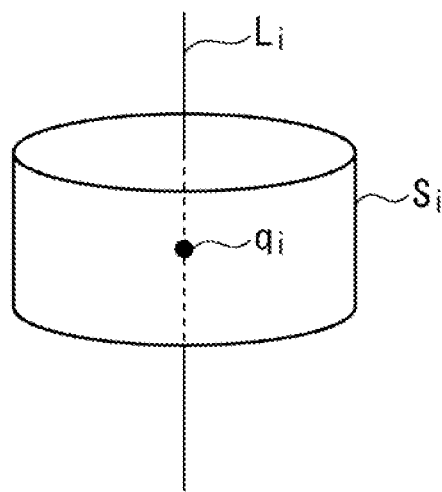
FIG. 2 is a diagram depicting a first example of a tolerance region according to the first example embodiment.

FIG. 2 is a diagram illustrating a first example of an i-th tolerance region. In FIG. 2, $L_i$ is a straight line parallel to the rotation axis and passing through the i-th second point cloud data point $q_i$. The set $S_i$ forms a cylinder that is centered at $q_i$ and that has bottom surfaces orthogonal to $L_i$. Since the bottom surfaces of the set $S_i$ are perpendicular to the rotation axis, and furthermore, the bottom surfaces and the side surfaces of the set $S_i$ are orthogonal, the set $S_i$ is a columnar body. The columnar body formed by the set $S_i$ is a union set of one columnar body, and is therefore a piecewise columnar body. That is, the set $S_i$ is a piecewise columnar body and may be an example of the i-th tolerance region. The example of the tolerance region depicted in FIG. 2 is an example of a set of three-dimensional points composed of points sufficiently close to the i-th second point cloud data point.

The tolerance region represented by the set $S_i$ is also referred to as the tolerance region $S_i$.

Figure 3:
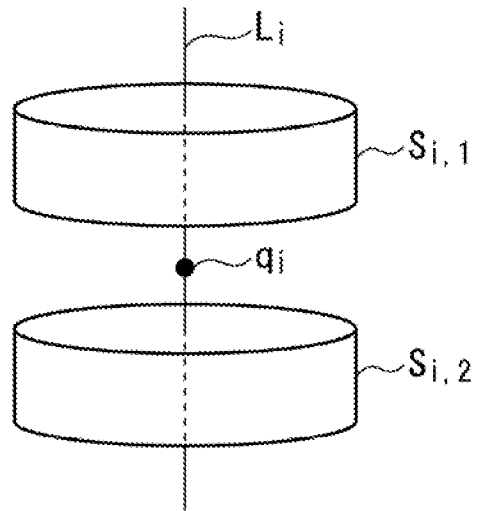
FIG. 3 is a diagram depicting a second example of a tolerance region according to the first example embodiment.

FIG. 3 is a diagram for explaining a second example of an i-th tolerance region. In FIG. 3, $L_i$ is a straight line parallel to the rotation axis and passing through the i-th second point cloud data point $q_i$. The set $S_{i,1}$ and the set $S_{i,2}$ each form a columnar body. The union set of the set $S_{i,1}$ and the set $S_{i,2}$ is a union set of two columnar bodies and is a piecewise columnar body, and thus may be an example of the i-th tolerance region. An example of the tolerance region depicted in FIG. 3 is an example of the set of three-dimensional points composed of points that are sufficiently close to the i-th second point cloud data point while maintaining a certain minimum distance from the i-th second point cloud data point. As depicted by the example in FIG. 3, the i-th tolerance region need not be limited to a continuous set. Additionally, as depicted by the example in FIG. 3, the i-th tolerance region need not include the i-th second data cloud data point.

The i-th tolerance region may be calculated based on an i-th distance function. The i-th distance function is a function that takes two three-dimensional points as arguments and that outputs a degree of desirability of the positional relationship between those two three-dimensional points. The more desirable the positional relationship between the two three-dimensional points is, the smaller the value that is output.

Expression (1) is a mathematical expression for explaining the method for calculating the i-th tolerance region based on an i-th distance function.

[Mathematical Expression 1]

$$S_i = \{x | D_i(x, q_i) \leq r[i]\} \quad (1)$$

In Expression (1), $D_i$ represents the i-th distance function. $q_i$ represents the i-th second point cloud data point. $r[i]$ is a real number characterizing the size of the tolerance region. In Expression (1), $S_i$ is the set of three-dimensional points x for which the positional relationship with respect to the i-th second point cloud data point $q_i$, calculated by the i-th distance function $D_i$, is more desirable than a desirability designated by the real number $r[i]$. When given an i-th distance function $D_i$ such that the set $S_i$ of Expression (1) forms a piecewise columnar body, the set $S_i$ in Expression (1) may be an example of the i-th tolerance region.

The size of the i-th tolerance region calculated based on the i-th distance function, as expressed by Expression (1), may be adjusted by the real number $r[i]$. As mentioned below, the parameter calculator 142 efficiently calculates positional adjustment parameters by using multiple i-th tolerance regions obtained from multiple real numbers $r[i]$ during operation.

Expression (2) corresponds to an example of an i-th distance function such that the set $S_i$ in Expression (1) forms a piecewise columnar body.

[Mathematical Expression 2]

$$d_i(a,b) = \max\{|a_z - b_z|, \sqrt{|a_x - b_x|^2 + |a_y - b_y|^2}\} \quad (2)$$

The function $d_i$ in Expression (2) is an example of an i-th distance function $D_i$ such that the set $S_i$ in Expression (1) forms a piecewise columnar body in the case in which the rotation axis is the z axis. a and b in Expression (2) are three-dimensional points. $a_x$ represents the x coordinate of a, $a_y$ represents the y coordinate of a, and $a_z$ represents the z coordinate of a. $b_x$ represents the x coordinate of b, $b_y$ represents the y coordinate of b, and $b_z$ represents the z coordinate of b. That is, the function $d_i$ in Expression (2) is a function for calculating the maximum values of the Euclidean distance between a and b in the z-axis direction and the Euclidean distance between a and b in the planar direction perpendicular to the z axis.

The set $S_i$ obtained by substituting the function $d_i$ in Expression (2) into the i-th distance function $D_i$ in Expression (1) is a cylinder having bottom surfaces perpendicular to the z axis. That is, in the case in which the rotation axis is the z axis, the set $S_i$ obtained by substituting the function $d_i$ in Expression (2) into the i-th distance function $D_i$ in Expression (1) can be an example of an i-th tolerance region. Even in the case in which the rotation axis is the z axis, an example of the i-th distance function such that the set $S_i$ in Expression (1) becomes a piecewise columnar body can be indicated by referring to the function $d_i$. In this case, the function $d_i$ in Expression (2) may be rewritten as a function for calculating the maximum values of the Euclidean distance between a and b in the rotation axis direction and the Euclidean distance between a and b in the planar direction perpendicular to the rotation axis.

An example of the evaluation function determined by the evaluation function determiner 13 will be explained by using Expression (3).

[Mathematical Expression 3]

$$E(u,v,\theta) = \Sigma_i w_i f_i(R_\theta p_i + t_{u,v}, S_i) \quad (3)$$

The function E in Expression (3) is an example of an evaluation function. represents a horizontal movement amount, v represents a linear movement amount, and θ represents a rotation amount, respectively calculated based on given positional adjustment parameters. In Expression (3), $p_i$ represents the i-th first point cloud data point, and $R_\theta$ represents a rotational conversion or a rotational matrix for rotating a three-dimensional point about the rotation axis by an angle designated by the rotation amount θ. $t_{u,v}$ represents a translational movement amount calculated from the horizontal movement amount u and the linear movement amount v. $S_i$ represents the i-th tolerance region.

The function $f_i$ is a function characterized by the tolerance region $S_i$, the function taking three-dimensional points as arguments and outputting values in accordance with whether the given three-dimensional points are contained in the tolerance region $S_i$. The function $f_i$ outputs a "1" in the case in which a three-dimensional point given as an argument is contained in the tolerance region $S_i$, and outputs a "0" in the case in which a three-dimensional point given as an argument is not contained in the tolerance region $S_i$.

The evaluation function determiner 13 determines an i-th weight $w_i$. The i-th weight $w_i$ is a real number representing the weight of the index i in the evaluation function E. The i-th weight $w_i$ may be a positive value, zero, or a negative value. The evaluation function E in Expression (3), for multiple indices i, determines whether the three-dimensional points "$R_\theta p_i + t_{u,v}$" are contained in the tolerance regions $S_i$, and sums the determination results, taking the weights $w_i$ into account. In the case in which the i-th weight $w_i$ is "1" for all of the indices i, the evaluation function E in Expression (3) may be described as counting the number of indices i for which the three-dimensional points "$R_\theta p_i + t_{u,v}$" are contained in the tolerance region $S_i$.

The evaluation function determined by the evaluation function determiner 13 may be expressed by directly using the i-th distance function in the case in which the i-th tolerance region is calculated by the i-th distance function. Expression (4) is a mathematical expression for explaining an example of the evaluation function for the case in which the i-th tolerance region $S_i$ is calculated by means of the i-th distance function $D_i$, using Expression (1).

[Mathematical Expression 4]

$$E_1(u,v,\theta;r) = \Sigma_i w_i (I_{r[i]} \cdot D_i)(R_\theta p_i + t_{u,v}, q_i) \quad (4)$$

The function $E_1$ indicated in Expression (4) is an example of an evaluation function expressed by directly using the i-th distance function. The symbols u, v, θ, $R_\theta$, $p_i$, $t_{u,v}$, and $w_i$ in Expression (4) have the same meanings as the identical symbols in Expression (3). Therefore, their explanation will be omitted. $q_i$ represents the i-th second point cloud data point, and $D_i$ represents the i-th distance function.

The function $I_{r[i]}$ is a function that takes a real number as an argument and that outputs a value in accordance with whether the argument is greater than the real number r[i]. The function $I_{r[i]}$ outputs a "0" when the argument is greater than r[i] and outputs a "1" when the argument is less than or equal to r[i]. Regarding the function $I_{r[i]}$, in the case in which the real number r[i] changes during a positional adjustment process, the boundary at which the output value switches may be adjusted by the value of the real number r[i] at that time.

The function $I_{r[i]} \cdot D_i$ is a composite function combining the function $I_{r[i]}$ and the i-th distance function $D_i$. The function $I_{r[i]} \cdot D_i$ takes two three-dimensional points as arguments, and if the output value when the two three-dimensional points that are the arguments are input to the distance function $D_i$ is larger than r[i], then the composite function outputs a "0", and if the output value is r[i] or less, then the composite function outputs a "1".

The r in Expression (4) is a group of r[i] for multiple indices i, characterizing the evaluation function $E_1$. The evaluation function $E_1$ in Expression (4) can be described as determining, for multiple indices i, whether the output value when the three-dimensional point "$R_\theta p_i + t_{u,v}$" and the three-dimensional point $q_i$ are input to the i-th distance function $D_i$ is r[i] or less, and summing the determination results, taking the weights $w_i$ into account.

In the case in which the i-th weight $w_i$ is "1" for all of the indices i, the evaluation function $E_1$ in Expression (4) may be described as counting the number of indices i such that, when the three-dimensional point "$R_\theta p_i + t_{u,v}$" and the three-dimensional point $q_i$ are input to the i-th distance function $D_i$, the output value is r[i] or less.

The i-th weight $w_i$ appearing in the examples of Expression (3) and Expression (4) are real numbers representing the degree of importance, in positional adjustment, of the mappings of the three-dimensional points indicated by the index i. The i-th weight may, for example, be considered to be "1" for all of the indices i. In this case, all of the mappings are considered to have the same degree of importance. Alternatively, calculations may be made based on the coordinates, in three-dimensional space, of at least one of the i-th first point cloud data point and the i-th second point cloud data point.

The i-th weight may be calculated, based on a first elevation angle representing the elevation angle when the i-th first point cloud data point is viewed from the origin of the first point cloud data and a second elevation angle representing the elevation angle when the i-th second point cloud data point is viewed from the origin of the second point cloud data, as the average of the reciprocal of the first elevation angle and the reciprocal of the second elevation angle. The i-th weight calculated based on the first elevation angle and the second elevation angle is particularly effective in cases such as when the origins of the point cloud data represent the locations of sensors from which point group data has been acquired. In such cases, the larger the reciprocal of the first elevation angle and the reciprocal of the second elevation angle are, the more similar in height the i-th first point cloud data point and the i-th second point cloud data point are to the positions of the sensors, and there is a high probability that the i-th first point cloud data point and the i-th second point cloud data point represent characteristic objects that could serve as markers when acquiring point cloud data.

The i-th weight may, for example, be calculated based on the distance from the rotation axis of at least one of the i-th first point cloud data point and the i-th second point cloud data point.

The i-th weight may, for example, be calculated based on the distance median value representing the median value of the distances from the rotation axis to the three-dimensional points included in the first point cloud data, and a first distance representing the distance from the rotation axis to the i-th first point cloud data point, as the reciprocal of the difference between the first distance and the distance median value. In such cases, the degree of importance in positional adjustment can be lowered for indices i for which the i-th first point cloud data point is too close to or too far from the rotation axis. Since a three-dimensional point that is too close to the rotation axis will be less affected by rotational conversion about the rotation axis during positional adjustment, an increase in the rotation amount estimation performance during positional adjustment can be expected by setting the i-th weight to be small for indices i for which the i-th first point cloud data point is too close to the rotation axis. Additionally, by setting the i-th weight to be small for indices i for which the i-th first point cloud data point is too far from the rotation axis, the effect of reducing the detrimental influence that points with stray values too far from the region at which the three-dimensional points are concentrated have on positional adjustment can be expected.

Alternatively, the i-th weight may be calculated based on the additional information of at least one of the i-th first point cloud data point or the i-th second point cloud data point. The i-th weight may, for example, be calculated based on differences in color information, calculated based on differences in reflection brightness, or calculated based on differences in feature quantities between the i-th first point cloud data point and the i-th second point cloud data point.

The examples of the evaluation functions indicated in Expression (3) and Expression (4) may include examples of various evaluation functions in accordance with the calculation method for the i-th weight. In the foregoing explanation, the non-zero output values of the function $f_i$ in Expression (3) and the function $I_{r[i]}$ in Expression (4) were limited to the value "1". However, the non-zero output values may take values other than "1". Evaluation functions in which the non-zero output values may take values other than "1" are equivalent to the evaluation functions in Expression (3) and Expression (4) when the i-th weight is converted to a fixed-value multiple by means of the non-zero output value of the function $f_i$ or the function $I_{r[i]}$.

Additionally, there may be modified examples in which the i-th weight is set to be a negative value in the evaluation functions indicated in Expression (3) and Expression (4), so that it is undesirable for the i-th first point cloud data point converted by positional adjustment to be contained in the i-th tolerance region. That is, differences such as whether the i-th tolerance region is to be incorporated into the evaluation function or whether a complement to the i-th tolerance region is to b incorporated into the evaluation function may be expressed by setting the i-th weight to be positive or negative.

As explained above, the evaluation function determiner 13 can map the three-dimensional points included in the first point cloud data to the three-dimensional points included in the second point cloud data by means of the indices i. Furthermore, the evaluation function determiner 13 can calculate an i-th tolerance region as a piecewise columnar body that can be considered to be a desirable destination to which the i-th first point cloud data point is to be moved by means of positional adjustment. Furthermore, the evaluation function determiner 13 can determine the i-th weights and can determine the evaluation function. Therefore, the evaluation function determiner 13 can determine a positional adjustment parameter evaluation function as a function for summing, while taking into account the i-th weights, determination results, for multiple indices i, regarding whether or not i-th first point cloud data points are contained in i-th tolerance regions due to the positional adjustment.

Next, the functions and operations of the positional adjustment computator 14 will be explained. The positional adjustment computator 14 calculates positional adjustment parameters for optimizing the evaluation function based on the rotation axis, the first point cloud data, and the second point cloud data. Optimizing the evaluation function may be described as making the output values from the evaluation function as large as possible. Alternatively, optimizing the evaluation function may be described as maximizing the output values from the evaluation function.

The positional adjustment computator 14 corresponds to an example of positional adjustment computing means.

Figure 4:
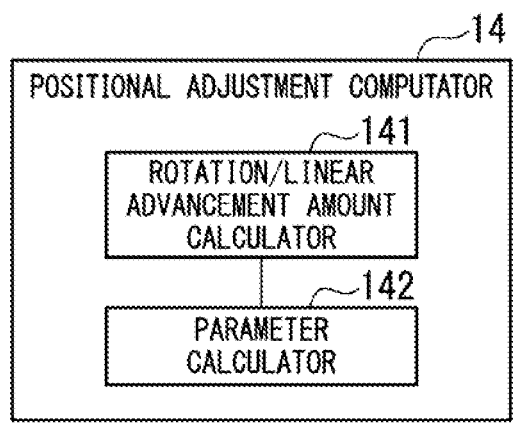
FIG. 4 is a diagram depicting an example of the configuration of a positional adjustment computator according to the first example embodiment.

FIG. 4 is a diagram depicting an example of the configuration of the positional adjustment computator 14. In the configuration depicted in FIG. 4, the positional adjustment computator 14 comprises a rotation/linear advancement amount calculator 141 and a parameter calculator 142. The rotation/linear advancement amount calculator 141 and the parameter calculator 142 may be software or modules in which processes are executed by a processor executing a program stored in memory. The rotation/linear advancement amount calculator 141 and the parameter calculator 142 may be hardware such as a circuit or a chip.

The positional adjustment computator 14 calculates the positional adjustment parameters for optimizing the evaluation function so as to be divided between a horizontal movement amount and a pair of a linear movement amount and a rotation amount. The positional adjustment computator 14 calculates the horizontal movement amount by using the parameter calculator 142. Furthermore, the positional adjustment computator 14 transfers the calculated horizontal movement amount to the rotation/linear advancement amount calculator 141, and calculates the linear movement amount and the rotation amount. Furthermore, the positional adjustment computator 14 calculates the positional adjustment parameters for optimizing the evaluation function based on the horizontal movement amount, the linear movement amount and the rotation amount that have been calculated.

The functions and the operations of the rotation/linear advancement amount calculator 141 will be explained. The rotation/linear advancement amount calculator 141 receives the horizontal movement amount and calculates a linear movement amount and a rotation amount that optimize the evaluation function.

Figure 5:
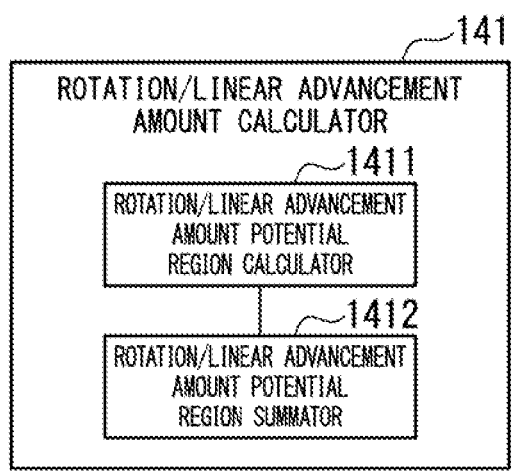
FIG. 5 is a diagram depicting an example of the configuration of a rotation/linear advancement amount calculator according to the first example embodiment.

FIG. 5 is a diagram depicting an example of the configuration of the rotation/linear advancement amount calculator 141. In the configuration depicted in FIG. 5, the rotation/linear advancement amount calculator 141 comprises a rotation/linear advancement amount potential region calculator 1411 and a rotation/linear advancement amount potential region summator 1412. The rotation/linear advancement amount potential region calculator 1411 and the rotation/linear advancement amount potential region summator 1412 may be software or modules in which processes are executed by a processor executing a program stored in memory. The rotation/linear advancement amount potential region calculator 1411 and the rotation/linear advancement amount potential region summator 1412 may be hardware such as a circuit or a chip.

The rotation/linear advancement amount calculator 141 uses the rotation/linear advancement amount potential region calculator 1411 to calculate, for multiple indices i, i-th rotation/linear advancement amount potential regions representing ranges of values that may be taken by the linear movement amounts and the rotation amounts such that the i-th first point cloud data points will be contained in the i-th tolerance regions by positional adjustment. Furthermore, the rotation/linear advancement amount calculator 141 uses the rotation/linear advancement amount potential region summator 1412 to calculate the optimal linear movement amount and rotation amount based on the i-th rotation/linear advancement amount potential regions and the i-th weights.

The functions and operations of the rotation/linear advancement amount potential region calculator 1411 will be explained. The rotation/linear advancement amount potential region calculator 1411 calculates i-th rotation/linear advancement amount potential regions for multiple indices i. The i-th rotation/linear advancement amount potential regions are regions formed by the set of pairs of linear advancement amounts and rotation amounts. The rotation/linear advancement amount potential region calculator 1411 calculates the i-th rotation/linear advancement amount potential regions so that, when a positional adjustment is specified by combining the pairs of linear movement amounts and rotation amounts contained therein with horizontal movement amounts provided to the rotation/linear advancement amount calculator 141, the destinations after conversion of the i-th first point cloud data points by the specified positional adjustment are contained in the i-th tolerance regions.

The functions and operations of the rotation/linear advancement amount potential region calculator 1411 will be explained by using FIG. 6.

Figure 6:
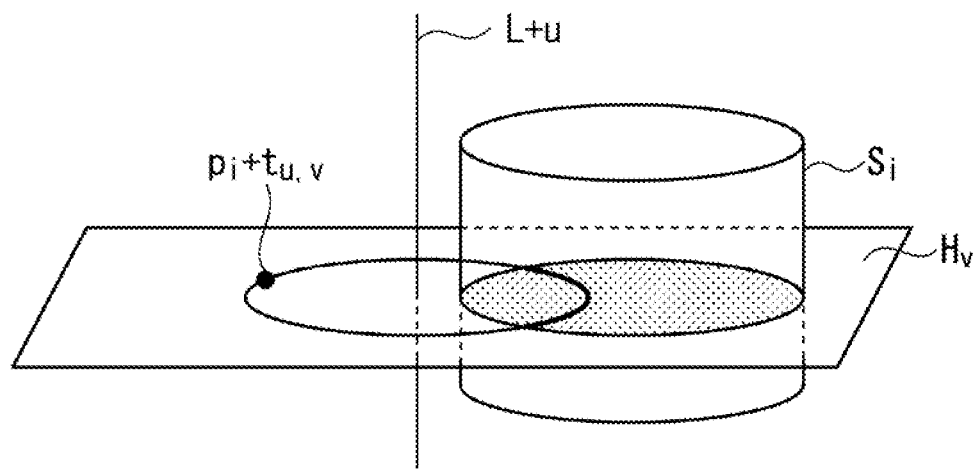
FIG. 6 is a diagram for explaining the operations in a rotation/linear advancement amount calculator according to the first example embodiment.

FIG. 6 is a diagram for explaining the operations of the rotation/linear advancement amount potential region calculator 1411 when a horizontal movement amount u has been given. In FIG. 6, the region $S_i$, represented by the cylinder, is the i-th tolerance region. The straight line "L+u" is a straight line parallel to the rotation axis, obtained by translationally moving the rotation axis in accordance with the horizontal movement amount u. The three-dimensional point "$p_i+t_{u,v}$" is a three-dimensional point characterized by the linear movement amount v, obtained by translationally moving the i-th first point cloud data point $p_i$ by the translational movement amount $t_{u,v}$ calculated from the horizontal movement amount u and the linear movement amount v.

The circumference passing through the three-dimensional point "$p_i+t_{u,v}$" with the straight line "L+u" as the axis is a trajectory described by the three-dimensional point "$R_\theta p_i + t_{u,v}$" when the rotation amount θ is changed to various values. $R_\theta$ is a rotational conversion or a rotational matrix for rotating a three-dimensional point about the rotation axis by an angular amount designated by the rotation amount θ. The boldface portion on the circumference is the portion that is common to both the circumference and the i-th tolerance region $S_i$. That is, the rotation amount θ corresponding to the boldface portion is a rotation amount θ such that, when the i-th first point cloud data is converted by the positional adjustment specified by the horizontal movement amount u, the linear movement amount v, and the rotation amount θ, the converted point is contained in the i-th tolerance region $S_i$.

The plane $H_v$ in FIG. 6 is a plane characterized by the linear movement amount v, including the circumference. The circle filled with the dot pattern is the cross-section of the tolerance region $S_i$ at the plane $H_v$. The rotation amount θ corresponding to the boldface portion can be calculated based on the portion common to the circumference and the circle with the dot pattern.

The i-th rotation/linear advancement amount potential region includes all pairs of linear movement amounts v for which there is a boldface portion as in FIG. 6, and rotation amounts θ corresponding to boldface portions defined in accordance with those linear movement amounts v. The i-th rotation/linear advancement amount potential region may be described as the set $M_i$ in Expression (5).

[Mathematical Expression 5]

$$M_i = \{(v,\theta) | R_\theta p_i + t_{u,v} \in S_i\} \quad (5)$$

All of the symbols other than $M_i$ appearing in Expression (5) have the same meanings as the same symbols appearing in Expression (3). Thus, the explanation thereof will be omitted here. The set $M_i$ in Expression (5) represents the set of all pairs of linear movement amounts v and rotation amounts θ such that the three-dimensional point "$R_\theta p_i + t_{u,v}$" is contained in the tolerance region $S_i$.

The rotation/linear advancement amount potential region calculator 1411 can efficiently calculate the i-th rotation/linear advancement amount potential region by making use of the fact that the i-th tolerance region is a piecewise columnar body. The cross-sections, on a plane perpendicular to the rotation axis, of each columnar body constituting the piecewise columnar body are two-dimensional shapes congruent with the bottom surface of each columnar body, or the null set. Furthermore, the cross-sections, on a plane perpendicular to the rotation axis, of each columnar body constituting the piecewise columnar body, and which is not the null set, are congruent shapes differing only by translational movement in the rotation axis direction. For this reason, the non-null sets of rotation amounts θ corresponding to the boldface portion depicted in FIG. 6 are all equivalent, irrespective of the linear movement amount v.

That is, for each of the columnar bodies constituting the piecewise columnar body, the set of i-th rotation/linear advancement amount potential regions associated with each columnar body can be calculated by taking the Cartesian product of the set of linear movement amounts v for which there are boldface portions as depicted in FIG. 6 and the set of rotation amounts θ corresponding to the boldface portions. Furthermore, the i-th rotation/linear advancement amount potential region can be calculated by taking the union set of all columnar bodies constituting the piecewise columnar body for the set associated with each columnar body.

As explained above, the rotation/linear advancement amount potential region calculator 1411 can, for multiple indices i, efficiently calculate the i-th rotation/linear advancement amount potential region by making use of the fact that the i-th tolerance region is a piecewise columnar body.

Next, the functions and the operations of the rotation/linear advancement amount potential region summator 1412 will be explained. The rotation/linear advancement amount potential region summator 1412 calculates, based on multiple i-th rotation/linear advancement amount potential regions, a linear movement amount and a rotation amount that optimize the evaluation function. The functions and the operations of the rotation/linear advancement amount potential region summator 1412 will be explained by using FIG. 7.

Figure 7:
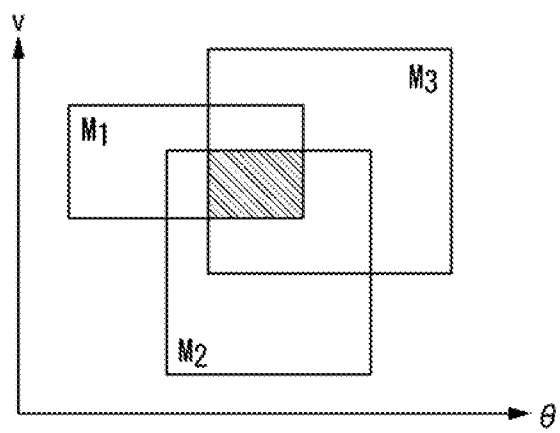
FIG. 7 is a diagram depicting an example of a parameter space according to the first example embodiment.

FIG. 7 is a diagram depicting an example of a parameter space having the linear movement amount v on the vertical axis and the rotation amount θ on the horizontal axis. In FIG. 7, $M_1$ represents a first rotation/linear advancement amount potential region, $M_2$ represents a second rotation/linear advancement amount potential region, and $M_3$ represents a third rotation/linear advancement amount potential region. It is sufficient for the i-th rotation/linear advancement amount potential region associated with at least one index i to be represented in the parameter space, and the number of the i-th rotation/linear advancement amount potential regions represented in the parameter space and the manner of selection of the indices i are not limited to anything specific.

The number of i-th rotation/linear advancement amount potential regions represented in the parameter space is not limited to three, and all of the i-th rotation/linear advancement amount potential regions may be represented in the parameter space. Additionally, the indices i of the i-th rotation/linear advancement amount potential regions represented in parameter space are not limited to serial numbers, and they may be randomly or regularly selected.

In FIG. 7, the i-th rotation/linear advancement amount potential regions are the union sets of the Cartesian products of a set of linear movement amounts and a set of rotation amounts, and thus are represented by rectangular union sets in parameter space. The rotation/linear advancement amount potential region summator 1412 calculates a linear movement amount v and a rotation amount θ based on the multiple rectangular distributions represented in parameter space.

The rotation/linear advancement amount potential region summator 1412 calculates the linear advancement amount v and the rotation amount θ based on points with high multiplicity in parameter space. The multiplicity of a point in parameter space is an amount obtained by summing the i-th weights $w_i$ in Expression (3) or Expression (4) for all indices i such that the i-th rotation/linear advancement amount potential region contains that point.

The evaluation functions represented by Expression (3) and Expression (4) output values that are equal to the multiplicities, in parameter space, of the linear movement amount v and the rotation amount θ given as arguments. That is, the rotation/linear advancement amount potential region summator 1412 can optimize the evaluation function by calculating the linear movement amount v and the rotation amount θ based on points with high multiplicity in parameter space.

The multiplicity of a point in parameter space is equal to the number of rectangles that overlap at that point in the case in which the i-th weight is equal to "1" for all indices i. The rotation/linear advancement amount potential region summator 1412 may, for example, calculate a linear advancement amount v and a rotation amount θ that are contained in the hatched portion of FIG. 7. The hatched portion in FIG. 7 is the region at which $M_1$, $M_2$, and $M_3$ most often overlap.

Even if the manner of selection of the i-th weight is not limited to anything specific, the rotation/linear advancement amount potential region summator 1412 can calculate a rectangular region in parameter space at which the multiplicity is maximized, for example, by a technique of calculating the region of maximum overlap of multiple rectangular regions, such as by planar scanning. Planar scanning is a technique for calculating a region at which the sum of weights is maximized when multiple weighted rectangular regions are distributed in a two-dimensional space.

In this case, all of the sides of the rectangular regions are parallel to at least one coordinate axis in two-dimensional space. In planar scanning, one coordinate axis in two-dimensional space is first selected. In the description hereinafter, the two-dimensional space will be referred to as XY space, the selected coordinate axis will be referred to as the X axis, and the other coordinate axis will be referred to as the Y axis. Planar scanning involves moving a horizontal line parallel to the X axis from the smallest value on the Y axis to the largest value on the Y axis, thereby searching for a region at which the sum of weights is maximized. In the initial state, the sum of the weights on the horizontal line is recorded as being "0". In planar scanning, when moving the horizontal line, scanning is implemented on the horizontal line each time the horizontal line overlaps with at least one side of a rectangular region parallel to the X axis.

In the explanation hereinafter, when implementing scanning on a horizontal line, among all of the sides of rectangular regions parallel to the X axis, those overlapping the horizontal line will be referred to as sides of interest. Scanning on a horizontal line is a process for updating the recorded sum of the weights on the horizontal line while traveling along the horizontal line from the lowest value on the X axis to the highest value on the X axis.

When scanning over a horizontal line, if a side of interest is a lower end of a rectangular region for all X-axis intervals for which the side of interest overlaps the horizontal line, then the record of the sum of the weights in the X-axis intervals on the horizontal line is updated by adding the weights in the rectangular region. The lower end of the rectangular region is the side for which the value of the Y axis is smaller between the two sides of the rectangular region parallel to the X axis.

On the other hand, in the case in which the side of interest is the upper end of a rectangular region, then the record of the sum of the weights in the X-axis intervals on the horizontal line is updated by subtracting the weights in the rectangular region. The upper end of the rectangular region is the side for which the value of the Y axis is higher between the two sides of the rectangular region parallel to the X axis.

In planar scanning, the region in which the sum of weights is maximized can be calculated by updating the record of the sum of weights while moving the horizontal line.

Alternatively, the rotation/linear advancement amount potential region summator 1412 may calculate the linear movement amount v and the rotation amount θ by searching for points in parameter space at which the multiplicity becomes as large as possible in the case in which there is no need to strictly maximize the evaluation function. The rotation/linear advancement amount potential region summator 1412 may randomly or regularly generate multiple points that serve as solution candidates in parameter space, and may calculate the linear movement amount v and the rotation amount θ based on the distribution of multiplicities in the multiple points that have been generated.

The rotation/linear advancement amount potential region summator 1412 may, for example, generate vertices or intersections of multiple i-th rotation/linear advancement amount potential regions represented in parameter space, and may calculate the linear movement amount v and the rotation amount θ based on the vertex or the intersection at which the multiplicity is the greatest. Alternatively, the rotation/linear advancement amount potential region summator 1412 may divide parameter space in the form of grids and generate representative points from the multiple grids, and may calculate the linear movement amount v and the rotation amount θ based on the representative point at which the multiplicity is the greatest.

As explained above, the rotation/linear advancement amount potential region summator 1412 can calculate points in parameter space at which the multiplicity is maximized or is as large as possible based on multiple i-th rotation/linear advancement amount potential regions.

As explained above, the rotation/linear advancement amount calculator 141 can use the rotation/linear advancement amount potential region calculator 1411 to efficiently calculate the i-th rotation/linear advancement amount potential region. Furthermore, the rotation/linear advancement amount calculator 141 can use the rotation/linear advancement amount potential region summator 1412 to calculate points in parameter space at which the multiplicity is maximized or is as large as possible. The multiplicity of a point in parameter space is equal to the output value of the evaluation function represented by Expression (3) or Expression (4) when positional adjustment parameters are calculated by combining the linear movement amount and the rotation amount represented by that point, and a horizontal movement amount received by the rotation/linear advancement amount calculator 141. Therefore, the rotation/linear advancement amount calculator 141 can receive a horizontal movement amount and calculate a linear movement amount and a rotation amount that optimize the evaluation function.

Next, the functions and the operations of the parameter calculator 142 will be explained. The parameter calculator 142 uses the rotation/linear advancement amount calculator 141 to calculate a horizontal movement amount that optimizes the evaluation function.

The parameter calculator 142 calculates an optimal evaluation value for at least one horizontal movement amount, and calculates a horizontal movement amount that optimizes the evaluation function based on the at least one optimal evaluation value that has been calculated. The optimal evaluation value for a horizontal movement amount is calculated by transferring the horizontal movement amount to the rotation/linear advancement amount calculator 14, and calculating a linear movement amount and a rotation amount, calculating positional adjustment parameters by combining the calculated linear movement amount and rotation amount with the horizontal movement amount, and taking the output value when the calculated positional adjustment parameters are input to the evaluation function. The horizontal movement amount calculated by the parameter calculator 142 may be the horizontal movement amount for which the optimal evaluation value is the largest for at least one horizontal movement amount.

The parameter calculator 142 may, for example, generate multiple horizontal movement amounts that serve as solution candidates and calculate optimal evaluation values for each of the multiple horizontal movement amounts that have been generated, then calculate a horizontal movement amount that optimizes the evaluation function based on the distribution of multiple optimal evaluation values that have been generated. The parameter calculator 142 may calculate the horizontal movement amount, among the multiple horizontal movement amounts that serve as solution candidates, for which the optimal evaluation value becomes the largest. The method by which the parameter calculator 142 generates multiple horizontal movement amounts that serve as solution candidates is not limited to anything specific. The multiple horizontal movement amounts that serve as solution candidates may be generated randomly or regularly. The multiple horizontal movement amounts that serve as solution candidates may be generated by dividing the horizontal movement amount search space in the form of grids, and calculating representative points from each of the grids. Just one of the multiple horizontal movement amounts may be generated.

Alternatively, the parameter calculator 142 may generate tentative solutions for the horizontal movement amount and may calculate the horizontal movement amount by successively updating the tentative solutions for the horizontal movement amount.

Figure 8:
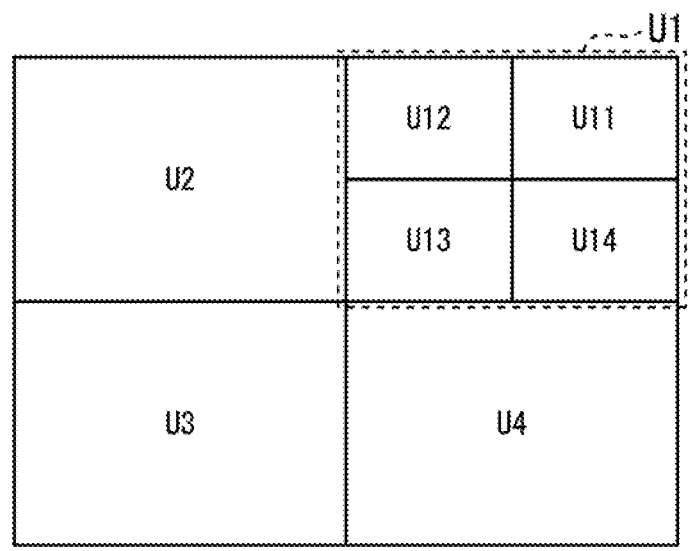
FIG. 8 is a diagram for explaining an example of a method by which a parameter calculator according to the first example embodiment updates a tentative solution for a horizontal movement amount.

FIG. 8 is a diagram for explaining an example of a method by which the parameter calculator 142 updates the tentative solutions for the horizontal movement amounts. The parameter calculator 142 first calculates optimal evaluation values of the tentative solutions for the horizontal movement amounts, and defines these values as tentative optimal evaluation values.

In FIG. 8, the parameter calculator 142 divides the horizontal movement amount search region into four sub-regions U1, U2, U3, and U4. The division method may be any that can divide the horizontal movement amount search region into multiple subregions, and is not limited to anything specific. The parameter calculator 142, for each of the sub-regions U1, U2, U3, and U4, generates one horizontal movement amount contained in the sub-region, and calculates an optimal evaluation value for each of the generated horizontal movement amounts, thereby calculating four optimal evaluation values.

The parameter calculator 142 updates a tentative optimal evaluation value by taking the maximum value among the tentative optimal evaluation value and the four optimal evaluation values, and updates the tentative solution for the horizontal movement amount by a horizontal movement amount corresponding to the updated tentative optimal evaluation value.

Next, the parameter calculator 142 selects one of the sub-regions by an arbitrary method, and further divides the selected subregion into multiple smaller sub-regions. Selecting one sub-region may also be described as sub-region selection.

In FIG. 8, the parameter calculator 142 selects the sub-region U1, and divides the sub-region U1 into the sub-regions U11, U12, U13, and U14. The parameter calculator 142 applies, to the selected sub-region U11, the same method as the method performed in the horizontal movement amount search region. That is, the parameter calculator 142, for each of the sub-regions U11, U12, U13, and U14, generates one horizontal movement amount contained in the sub-region, and calculates the optimal evaluation value for each of the generated horizontal movement amounts, thereby calculating four evaluation values.

The parameter calculator 142 updates the tentative optimal evaluation value by taking the maximum value among the tentative optimal evaluation value and the four evaluation values, and updates the tentative solution for the horizontal movement amount by the horizontal movement amount corresponding to the updated tentative optimal evaluation value. The parameter calculator 142 performs sub-region selectin and further divides the selected sub-region into multiple smaller sub-regions. The sub-region selection may involve selecting one of the sub-regions that have been calculated but that have not yet been selected. That is, in FIG. 8, the parameter calculator 142 may select one sub-region from among the sub-regions that have been calculated, i.e., U2, U3, U4, U11, U12, U13, and U14, aside from U1, which has already been selected.

In this way, the parameter calculator 142 can repeat, a certain number of times or until a certain criterion is satisfied, the sequential method that includes division into sub-regions, calculation of an optimal evaluation value in each sub-region, updating of the tentative optimal evaluation value and the tentative solution for the horizontal movement amount, and sub-region selection, thereby successively updating the tentative solution for the horizontal movement amount.

Alternatively, in the case in which the evaluation function is the evaluation function $E_i$ in Expression (4), the parameter calculator 142 may use a branch-and-bound method to successively update the tentative solution for the horizontal movement amount. The branch-and-bound method is an optimization technique in which an upper limit for an evaluation function is used to narrow down optimal solution candidates. The parameter calculator 142, in the case in which the branch-and-bound method is used, can narrow down the optimal solution candidates for the horizontal movement amount by selecting, during sub-region selection, sub-regions for which the upper limit of the evaluation function $E_1$ in the sub-region is large. This is because, in such a case, the sub-region selection is for pruning away sub-regions in which the upper limit of the evaluation function in the sub-region is smaller than the tentative optimal evaluation value calculated from the tentative solution for the horizontal movement amount. In other words, the sub-region selection involves excluding, from among the selection options, sub-regions for which there is no possibility that a horizontal movement amount that is more optimal than the tentative solution for the horizontal movement amount would be contained therein.

Expression (6) is a mathematical expression for explaining the upper limit of the evaluation function in a sub-region.

[Mathematical Expression 6]

$$E_{max}(U) = \max_{v,\theta} E_1(u_U, v, \theta; r + \delta_U) \qquad (6)$$
$$\geq \max_{u \in U} \max_{v,\theta} E_1(u, v, \theta; r)$$

The function $E_{max}$ in Expression (6) takes a sub-region U as an argument, and outputs the upper limit $E_{max}(U)$ of the evaluation function $E_1$ indicated in Expression (4) when the horizontal movement amount is contained within the sub-region U. The upper half "$E_{max}(U) = \max_{v,\theta} E_1(u_U, v, \theta; r+\delta_U)$" of Expression (6) is a definition of the function $E_{max}$. $u_U$ need only be a horizontal movement amount that is contained in the sub-region U, and is not limited to anything specific. For example, $u_U$ may be the center of gravity of the sub-region U.

$\delta_U$ is a group of real numbers $\delta_U[i]$ for multiple indices i. $\delta_U[i]$ is a real number such that the sub-region U is contained in the set of horizontal movement amounts for which the distance from the horizontal movement amount $u_U$, measured by using the i-th distance function, is $\delta_U[i]$ or less. For example, in the case in which the i-th distance function is a function $d_i$ as in Expression (2), $\delta_U[i]$ may be the Euclidean distance between the horizontal movement amount $u_U$ and the horizontal movement amount that is farthest from the horizontal movement amount $u_U$ among the horizontal movement amounts contained in the sub-region U. Such a $\delta_U[i]$ can be calculated as the maximum value of the distance between the horizontal movement amount $u_U$ and the end of the sub-region U. In Expression (6), $r+\delta_U$ is a group of the sums of the real number $\delta_U[i]$ and the real number $r[i]$ for multiple indices i.

According to the upper half of Expression (6), $E_{max}(U)$ is calculated by calculating a linear movement amount v and a rotation amount θ that maximize the output value of the evaluation function $E_1$ redefined by replacing the portion denoted by r in Expression (4) with $r+\delta_U$. That is, $E_{max}$ in Expression (6) may be calculated by using the rotation/linear advancement amount calculator 141.

The lower half "$E_{max}(U) \geq \max_{u \in U} \max_{v,\theta} E_1(u, v, \theta; r)$" in Expression (6) is an inequality indicating that $E_{max}(U)$ is the upper limit of the evaluation function $E_1$. According to the lower half of Expression (6), $E_{max}(U)$ evaluates the output value of the evaluation function $E_1$ when the horizontal movement amount is contained in the sub-region U from above by means of an inequality. That is, according to Expression (6), the parameter calculator 142 can use the rotation/linear advancement amount calculator 141 to calculate, for the sub-region U, the upper limit of the evaluation function $E_1$ when the horizontal movement amount is contained in U.

When using the branch-and-bound method, the parameter calculator 142 may, during sub-region selection, calculate the upper limit of each sub-region that can be selected, and may select the sub-region that maximizes the upper limit. Additionally, the parameter calculator 142 may use the criterion that the difference between the upper limit of the sub-region selected by the sub-region selection and the tentative optimal evaluation value is small or "0", to stop repeating the serial method of division into sub-regions, calculation of the optimal evaluation value in each of the sub-regions, updating of the tentative optimal evaluation value and the tentative solution of the horizontal movement amount, and sub-region selection.

As mentioned above, the parameter calculator 142 can use the rotation/linear advancement amount calculator 141 to calculate an optimal evaluation value for at least one horizontal movement amount, and can calculate a horizontal movement amount that optimizes the evaluation function based on the distribution of at least one of the calculated optimal evaluation values.

As mentioned above, the positional adjustment computator 14 can use the parameter calculator 142 to calculate a horizontal movement amount that optimizes the evaluation function. Furthermore, the positional adjustment computator 14 can use the rotation/linear advancement amount calculator 141 to calculate, for the calculated horizontal movement amount, a linear movement amount and a rotation amount that optimize the evaluation function. Therefore, the positional adjustment computator 14 can calculate positional adjustment parameters that optimize the evaluation function from the horizontal movement amount, and the linear movement amount and rotation amount that have been calculated.

As mentioned above, the measurement device 10 can use the point cloud data acquirer 11 to acquire two sets of point group data that can be positionally adjusted by specifying a rotation axis. Furthermore, the measurement device 10 can use the rotation axis determiner 12 to determine the rotation axis for positional adjustment. Furthermore, the measurement device 10 can use the evaluation function determiner 13 to determine an evaluation function for measuring the desirability of a positional adjustment result. Furthermore, the measurement device 10 can use the positional adjustment computator 14 to calculate positional adjustment parameters that optimize the evaluation function.

Figure 9:
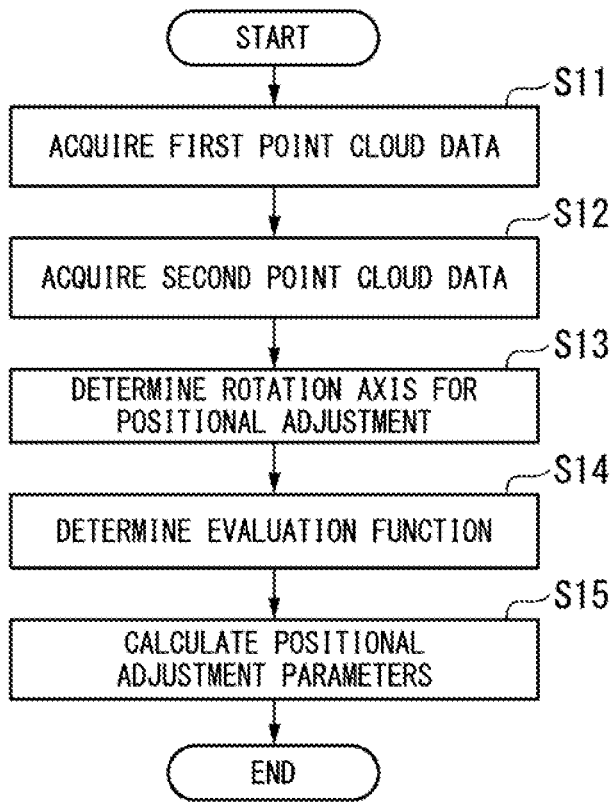
FIG. 9 is a diagram depicting an example of a processing procedure for a measurement device according to the first example embodiment.

Next, FIG. 9 will be used to explain the flow of the positional adjustment process according to the first example embodiment.

FIG. 9 is a diagram depicting an example of the processing procedure in measurement device 10.

In the process in FIG. 9, the point cloud data acquirer 11 acquires first point cloud data at a first measurement position (step S11). Next, the point cloud data acquirer 11 acquires second point cloud data at a second measurement position (step S12). Next, the rotation axis determiner 12 determines a rotation axis for positional adjustment (step S13). Next, the evaluation function determiner 13 determines an evaluation function defined by a piecewise columnar body based on the rotation axis, the first point cloud data, and the second point cloud data (step S14). Next, the positional adjustment computator 14 calculates positional adjustment parameters that optimize the evaluation function based on the rotation axis, the first point cloud data, and the second point cloud data (step S15). The positional adjustment computator 14 can use the rotation/linear advancement amount calculator 141 to efficiently calculate the positional adjustment parameters by making use of the fact that the evaluation function is defined by a piecewise columnar body.

In FIG. 9, the first point cloud data does not need to be used in step S12 and step S13. In this case, step S11 may be executed after step S12, and may be executed after step S13. Additionally, the second point cloud data does not need to be used in step S13. In this case, step S12 may be executed after step S13. In step S13, the rotation axis can be determined without making use of the point cloud data by using a specific coordinate axis as the rotation axis.

As explained above, the measurement device 10 can efficiently calculate the positional adjustment parameters that optimize the desirability of positional adjustment results for two sets of point cloud data that have been acquired. In particular, the measurement device 10 can efficiently calculate the positional adjustment parameters so that the distance between two points that have been mapped to each other becomes closer.

As described above, the point cloud data acquirer 11 acquires first point cloud data at a first measurement position and second point cloud data at a second measurement position. The rotation axis determiner 12 determines the rotation axis for positional adjustment. The evaluation function determiner 13 determines, based on the rotation axis determined by the rotation axis determiner 12, the first point cloud data acquired by the point cloud data acquirer 11, and the second point cloud data acquired by the point cloud data acquirer 11, an evaluation function indicating a region that is a union set of one or more columnar bodies as an evaluation function representing the desirability of positional adjustment results. The positional adjustment computator 14 calculates positional adjustment parameters that optimize the evaluation function based on the rotation axis determined by the rotation axis determiner 12, the first point cloud data acquired by the point cloud data acquirer 11, and the second point cloud data acquired by the point cloud data acquirer 11.

In this way, the evaluation function determiner 13 can determine an evaluation function indicating a region that is a union set of one or more columnar bodies as an evaluation function representing the desirability of positional adjustment results, thereby allowing positional adjustment results to be evaluated by distinguishing between the rotation axis direction and the directions perpendicular to the rotation axis direction. According to the measurement device 10, due to this feature, positional adjustment can be performed by making use of disparities between the differences in data between point clouds in the rotation axis direction and the differences in data between point clouds in directions perpendicular to the rotation axis. As a result thereof, the measurement device 10 is expected to be able to efficiently perform positional adjustment while requiring a relatively small number of parameters for positional adjustment.

Additionally, the positional adjustment computator 14 calculates, by different means, the horizontal movement amount associated with point cloud data movement in the axial direction of the rotation axis and the linear movement amount associated with point cloud data movement in directions perpendicular to the rotation axis.

According to the measurement device 10, positional adjustment can be performed by making use of disparities between the differences in data between point clouds in the rotation axis direction and the differences in data between point clouds in directions perpendicular to the rotation axis. Thus, it can be expected to be able to efficiently perform positional adjustment.

Second Example Embodiment

Figure 10:
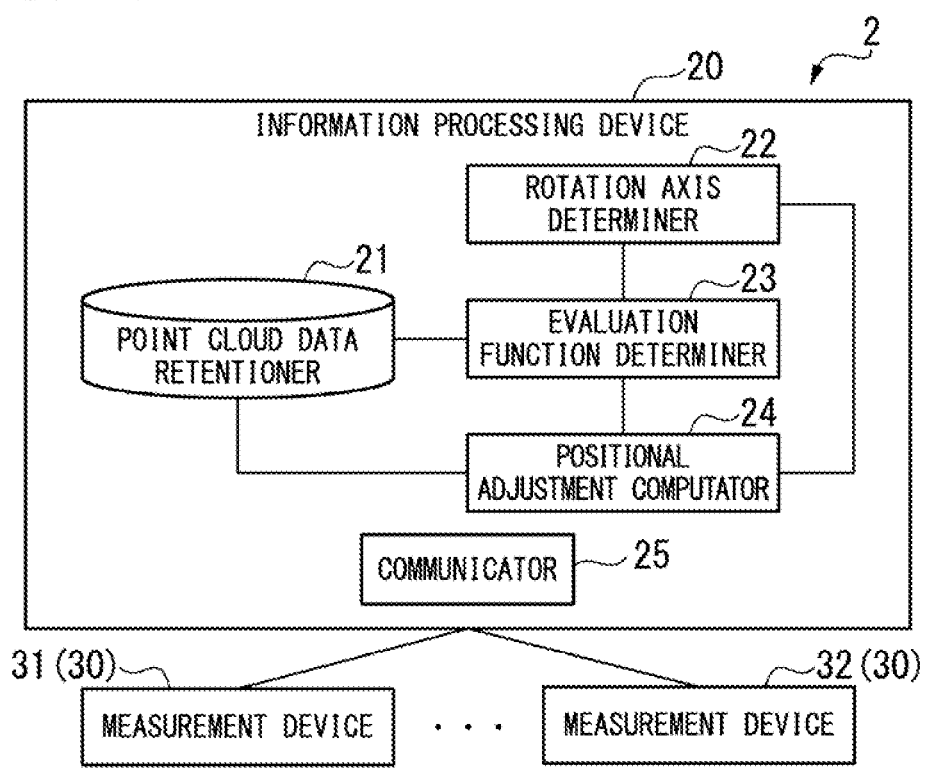
FIG. 10 is a diagram depicting an example of a configuration of a communication system according to a second example embodiment.

FIG. 10 is a diagram depicting an example of the configuration of a communication system according to a second example embodiment. In the configuration depicted in FIG. 10, the communication system 2 comprises an information processing device 20, a measurement device 31, and a measurement device 32. The measurement device 31 and the measurement device 32 will also be referred to collectively as measurement devices 30.

FIG. 10 depicts an example of the case in which the communication system 2 comprises two measurement devices 30. However, the communication system 2 may comprise three or more measurement device 30. Alternatively, the communication system 2 may comprise just one measurement device 30.

The information processing device 20 may be a computer device that operates by a processor executing a program stored in memory. The information processing device 20 may communicate with the measurement device 31 and the measurement device 32 via a wireless communication channel or may communicate via a wired communication channel.

Wireless communication may, for example, be communication using a wireless communication standard defined as 5G in LTE (Long Term Evolution, LTE is a registered trademark) or 3GPP (3rd Generation Partnership Project). Alternatively, the wireless communication may be over a wireless LAN (Local Area Network), or may be short-range wireless communication such as infrared communication, Bluetooth (registered trademark), or the like. Wired communication channels may involve communication using optical communication lines or Ethernet (registered trademark).

Additionally, the information processing device 20 may communicate only with the measurement device 31. In this case, the measurement device 31 may collect data by communicating with the measurement device 32, and may transmit the collected data to the information processing device 20. Alternatively, the measurement device 31 may acquire multiple items of data, and may transmit the multiple items of data that have been acquired to the information processing device 20.

The information processing device 20 receives multiple items of point cloud data acquired by the measurement devices via communication. The information processing device 20 may receive, together with the point cloud data, device information regarding the measurement devices that acquired the point cloud data. The device information need only be information that identifies the individual measurement device that acquired the point cloud data, and is not limited to anything specific. The device information may, for example, be manufacturing numbers, IP addresses, or numbers pre-assigned to the measurement devices by the communication system 2. As mentioned below, in the case in which the information processing device 20 receives device information together with the point cloud data, the information processing device 20 can associate the calculated positional adjustment parameters with the individual measurement devices.

An example of the configuration of the information processing device 20 will be explained. In the configuration depicted in FIG. 10, the information processing device 20 comprises a point cloud data retentioner 21, a rotation axis determiner 22, an evaluation function determiner 23, a positional adjustment computator 24, and a communicator 25. The rotation axis determiner 22, the evaluation function determiner 23, and the positional adjustment computator 24 correspond to the rotation axis determiner 12, the evaluation function determiner 13, and the positional adjustment computator 14 in the measurement device 10 in FIG. 1.

That is, the information processing device 20 executes the processes of determining the rotation axis, determining the evaluation function, and calculating the positional adjustment parameters, which were executed by the measurement device in FIG. 1. The functions and the operations of the rotation axis determiner 22, the evaluation function determiner 23, and the positional adjustment computator 24 are the same as the functions and operations of the rotation axis determiner 12, the evaluation function determiner 13, and the positional adjustment computator 14, and thus detailed explanations thereof will be omitted here.

The point cloud data retentioner 21 retains point cloud data acquired in the measurement devices, which is received by the information processing device 20 by communication. The point cloud data retentioner 21 retains at least two sets of point cloud data. The point cloud data retentioner 21 may, for example, be a memory internal to the information processing device 20, or may be a memory that can be attached to the information processing device 20.

The point cloud data retentioner 21 corresponds to an example of a point cloud data retaining means.

The information processing device 20 selects, from the point cloud data retained in the point cloud data retentioner 21, first point cloud data received from a first measurement device and second point cloud data received from a second measurement device. The measurement device 31 may correspond to an example of the first measurement device and the measurement device 32 may correspond to an example of the second measurement device. Alternatively, the measurement device 32 may correspond to an example of the first measurement device and the measurement device 31 may correspond to an example of the second measurement device.

Furthermore, the information processing device 20 calculates positional adjustment parameters for the first point cloud data and the second point cloud data that have been selected, by a method similar to that in the measurement device 10. That is, the process performed by the information processing device 20 calculates the positional adjustment parameters by executing, regarding the first point cloud data and the second point cloud data that have been selected, processes for determining the rotation axis, determining the evaluation function, and calculating the positional adjustment parameters, corresponding to the processes in steps S13, S14, and S15 in FIG. 9.

When the information processing device 20 receives device information together with point cloud data, the information processing device 20 can associate the positional adjustment parameters that have been calculated to individual measurement devices. That is, the information processing device 20 can associate the calculated positional adjustment parameters with the first measurement device and the second measurement device.

The information processing device 20 may transmit the calculated positional adjustment parameters to the first measurement device and the second measurement device by communication. Alternatively, the information processing device 20 may transmit the calculated positional adjustment parameters to all of the measurement devices by communication. In this case, the measurement devices that have received the positional adjustment parameters can, from the horizontal movement amount, the linear movement amount, and the rotation amount calculated from the positional adjustment parameters, recognize their own positions and orientations at the time of acquiring the point cloud data.

The information processing device 20 may calculate a first measurement position at which the first point group data was acquired and a second measurement position at which the second point group data was acquired based on the calculated positional adjustment parameters, and may transmit information regarding the first measurement position and the second measurement position to the first measurement device and the second measurement device by means of communication.

The communicator 25 may communicate with another device. In particular, the communicator 25 communicates with the measurement devices 30 to exchange various types of data as mentioned above. For example, the communicator 25 receives point group data acquired by each of the multiple measurement devices 30. The communicator 25 corresponds to an example of a communicating means.

As described above, the communicator 25 receives point cloud data acquired by each of the multiple measurement devices 30. The point cloud data retentioner 21 retains first point cloud data received from the first measurement device and second point cloud data received from the second measurement device. The rotation axis determiner 22 determines the rotation axis for positional adjustment. The evaluation function determiner 23 determines, based on the rotation axis determined by the rotation axis determiner 22, the first point cloud data retained by the point cloud data retentioner 21, and the second point cloud data retained by the point cloud data retentioner 21, an evaluation function indicating a region that is a union set of one or more columnar bodies as an evaluation function representing the desirability of positional adjustment results. The positional adjustment computator 24 calculates positional adjustment parameters that optimize the evaluation function based on the rotation axis determined by the rotation axis determiner 22, the first point cloud data retained by the point cloud data retentioner 21, and the second point cloud data retained by the point cloud data retentioner 21.

In this way, the information processing device 20 performs processes relating to determining the rotation axis, determining the evaluation function, and calculating the positional adjustment parameters instead of the measurement device 30, thereby allowing the processing load in the measurement devices 30 to be reduced. The measurement devices 30 are, for example, LiDAR devices or the like, which often have low processing capacity in comparison with common server devices or the like. For this reason, the risk of malfunctions that may occur in the measurement devices 30 can be reduced by reducing the processing loads in the measurement devices 30.

Third Example Embodiment

Figure 11:
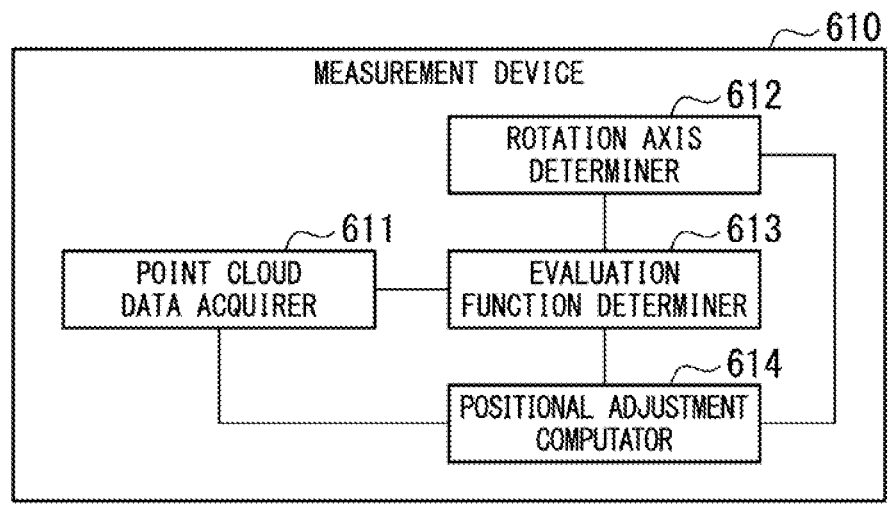
FIG. 11 is a diagram depicting an example of a configuration of a measurement device according to a third example embodiment.

FIG. 11 is a diagram depicting an example of the configuration of a measurement device according to a third example embodiment. In the configuration depicted in FIG. 11, the measurement device 610 comprises a point cloud data acquirer 611, a rotation axis determiner 612, an evaluation function determiner 613, and a positional adjustment computator 614.

In this configuration, the point cloud data acquirer 611 acquires first point cloud data at a first measurement position and second point cloud data at a second measurement position. The rotation axis determiner 612 determines a rotation axis for positional adjustment. The evaluation function determiner 613 determines, based on the rotation axis determined by the rotation axis determiner 612, the first point cloud data acquired by the point cloud data acquirer 611, and the second point cloud data acquired by the point cloud data acquirer 611, an evaluation function indicating a region that is a union set of one or more columnar bodies as an evaluation function representing the desirability of positional adjustment results. The positional adjustment computator 614 calculates positional adjustment parameters that optimize the evaluation function based on the rotation axis determined by the rotation axis determiner 612, the first point cloud data acquired by the point cloud data acquirer 611, and the second point cloud data acquired by the point cloud data acquirer 611.

The point cloud data acquirer 611 corresponds to an example of point cloud data acquiring means. The rotation axis determiner 612 corresponds to an example of rotation axis determining means. The evaluation function determiner 613 corresponds to an example of evaluation function determining means. The positional adjustment computator 614 corresponds to an example of positional adjustment computing means.

In this way, the evaluation function determiner 613 can determine an evaluation function indicating a region that is a union set of one or more columnar bodies as an evaluation function representing the desirability of positional adjustment results, thereby allowing positional adjustment results to be evaluated by distinguishing between the rotation axis direction and directions perpendicular to the rotation axis direction. According to the measurement device 610, due to this feature, positional adjustment can be performed by making use of disparities between the differences in data between point clouds in the rotation axis direction and the differences in data between point clouds in the directions perpendicular to the rotation axis. As a result thereof, the measurement device 610 is expected to be able to efficiently perform positional adjustment while only requiring a relatively small number of parameters for positional adjustment.

Fourth Example Embodiment

Figure 12:
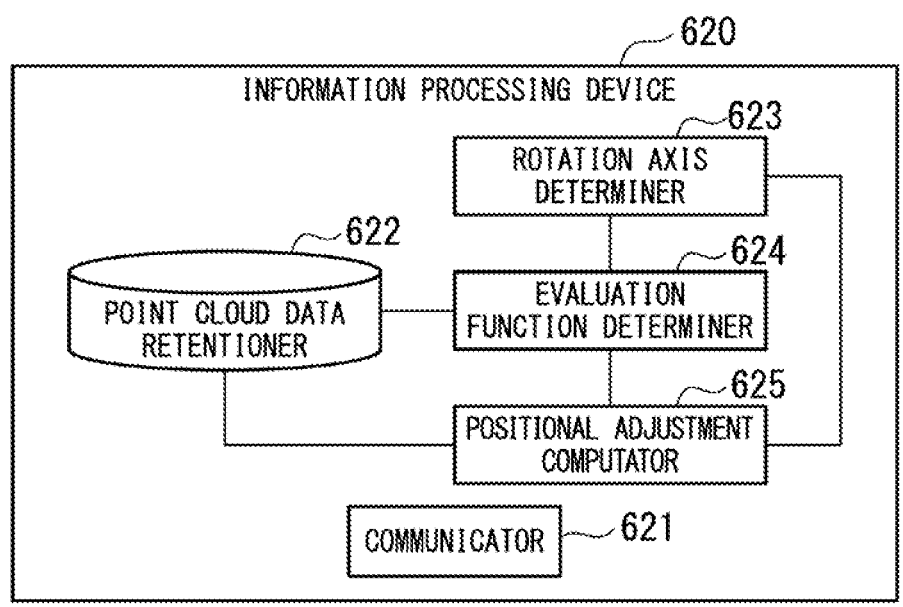
FIG. 12 is a diagram depicting an example of a configuration of an information processing device according to a fourth example embodiment.

FIG. 12 is a diagram depicting an example of the configuration of an information processing device according to a fourth example embodiment. In the configuration depicted in FIG. 12, the information processing device 620 comprises a communicator 621, a point cloud data retentioner 622, a rotation axis determiner 623, an evaluation function determiner 624, and a positional adjustment computator 625.

In this configuration, the communicator 621 receives point cloud data acquired by each of multiple measurement devices. The point cloud data retentioner 622 retains first point cloud data received from a first measurement device and second point cloud data received from a second measurement device. The rotation axis determiner 623 determines a rotation axis for positional adjustment. The evaluation function determiner 624 determines, based on the rotation axis determined by the rotation axis determiner 623, the first point cloud data retained in the point cloud data retentioner 622, and the second point cloud data retained in the point cloud data retentioner 622, an evaluation function indicating a region that is a union set of one or more columnar bodies as an evaluation function representing the desirability of positional adjustment results. The positional adjustment computator 625 calculates positional adjustment parameters that optimize the evaluation function based on the rotation axis determined by the rotation axis determiner 22, the first point cloud data retained by the point cloud data retaining means, and the second point cloud data retained by the point cloud data retentioner 21.

The communicator 621 corresponds to an example of communicating means. The point cloud data retentioner 622 corresponds to an example of point cloud data retaining means. The rotation axis determiner 623 corresponds to an example of rotation axis determining means. The evaluation function determiner 624 corresponds to an example of evaluation function determination. The positional adjustment computator 625 corresponds to an example of positional adjustment computing means.

In this way, the information processing device 620 performs processes relating to determination of the rotation axis, determination of the evaluation function, and calculation of the positional adjustment parameters instead of the measurement devices, thereby allowing the processing load in the measurement devices to be reduced. The measurement devices are, for example, LiDAR devices or the like, which often have low processing capacity in comparison with common server devices or the like. For this reason, the risk of malfunctions that may occur in the measurement devices can be reduced by reducing the processing loads in the measurement devices.

Fifth Example Embodiment

Figure 13:
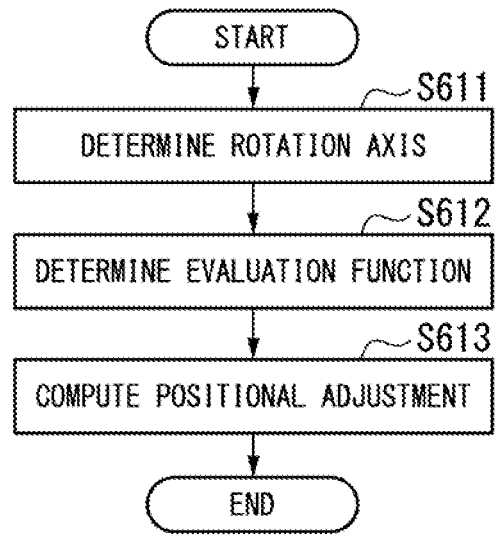
FIG. 13 is a diagram depicting an example of a processing procedure for a position adjustment method according to a fifth example embodiment.

FIG. 13 is a diagram depicting an example of the processing procedure in a position adjustment method according to a fifth example embodiment. The position adjustment method depicted in FIG. 13 includes steps for determining a rotation axis (step S611), determining an evaluation function (step S612), and performing a positional adjustment computation (step S613).

In the step of determining a rotation axis (step S611), a rotation axis for positional adjustment of the first point cloud data and the second point cloud data is determined. In the step of determining an evaluation function (step S612), an evaluation function indicating a region that is a union set of one or more columnar bodies is determined as an evaluation function representing the desirability of positional adjustment results, based on the rotation axis, the first point cloud data, and the second point cloud data. In the step of performing a positional adjustment computation (step S613), positional adjustment parameters that optimize the evaluation function are calculated based on the rotation axis, the first point cloud data, and the second point cloud data.

In this way, an evaluation function indicating a region that is a union set of one or more columnar bodies can be determined as an evaluation function representing the desirability of positional adjustment results, thereby allowing positional adjustment results to be evaluated by distinguishing between the rotation axis direction and the directions perpendicular to the rotation axis direction. According to the position adjustment method depicted in FIG. 13, due to this feature, positional adjustment can be performed by making use of disparities between the differences in data between point clouds in the rotation axis direction and the differences in data between point clouds in the directions perpendicular to the rotation axis. As a result thereof, the position adjustment method depicted in FIG. 13 is expected to be able to efficiently perform positional adjustment while requiring a relatively small number of parameters for positional adjustment.

Figure 14:
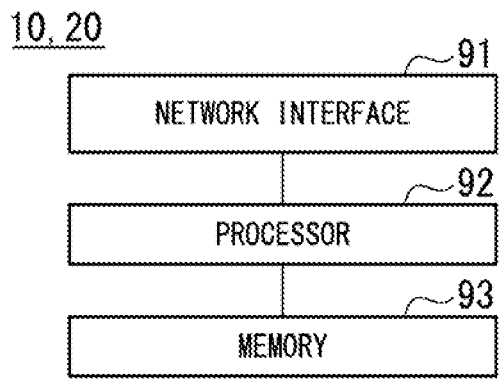
FIG. 14 is a block diagram depicting an example of a configuration of a measurement device and an information processing device according to at least one example embodiment.

FIG. 14 is a block diagram depicting an example of the configuration of a measurement device 10 and an information processing device 20 (hereinafter referred to as the measurement device 10 etc.). Referring to FIG. 14, the measurement device 10 etc. includes a network interface 91, a processor 92, and a memory 93.

The network interface 91 is used for communicating with network nodes (for example, eNBs, MMEs, P-GWs, etc.). The network interface 91 may include, for example, a network interface card (NIC) supporting the IEEE 802.3 series.

The processor 92 performs processes such as those of the measurement device 10 etc. explained using the flow chart in the above-described example embodiments by reading out and executing software (computer program) from the memory 93. The processor 92 may, for example, be a microprocessor, an MPU, or a CPU. The processor 92 may include multiple processors.

The memory 93 is configured by means of a combination of volatile memory and non-volatile memory. The memory 93 may include storage located remotely from the processor 92. In this case, the processor 92 may access the memory 93 via an I/O interface that is not explicitly indicated.

In the example in FIG. 14, the memory 93 is used for storing software module groups. The processor 92 can perform processes such as those of the measurement device 10 etc. explained in the example embodiments above by reading out and executing these software module groups from the memory 93.

As explained by using FIG. 14, each of the processors in the measurement device 10 etc. in the example embodiment above each execute one or multiple programs including a command group for making a computer perform an algorithm as explained using the drawing.

In the examples above, a program can be stored by using various types of non-transitory computer-readable media, and supplied to a computer. The non-transitory computer-readable media include various types of tangible storage media.

Examples of non-transitory computer-readable media include magnetic recording media (for example, flexible disks, magnetic tape, hard disk drives), magneto-optic recording media (for example, magneto-optic disks), CD-ROMs (Read-Only Memory), CD-Rs, CD-R/Ws, semiconductor memory (for example, mask ROMs, PROMs (programmable ROMs), EPROMs (erasable PROMs), flash ROMs, and RAM (Random Access Memory)).

The present disclosure is not limited to the foregoing embodiments, and modifications can be made, as appropriate, within a range not departing from the spirit of the invention.

INDUSTRIAL APPLICABILITY

Example Embodiments of the present invention can be applied to measurement devices, information processing devices, position adjustment methods, and computer-readable media.

REFERENCE SIGNS LIST

2 Communication system
10, 31, 32, 610 Measurement device
11, 611 Point cloud data acquirer
12, 22, 612 Rotation axis determiner
13, 23, 613 Evaluation function determiner
14, 24, 614 Positional adjustment computator
141 Rotation/linear advancement amount calculator
1411 Rotation/linear advancement amount potential region calculator
1412 Rotation/linear advancement amount potential region summator
142 Parameter calculator
20 Information processing device
21 Point cloud data retentioner
25 Communicator

What is claimed is:

1. A measurement device comprising:
a memory configured to store instructions; and
a processor configured to execute the instructions to:
acquire first point cloud data at a first measurement position and second point cloud data at a second measurement position;
determine a rotation axis for positional adjustment;
determine, based on the determined rotation axis, the acquired first point cloud data, and the acquired second point cloud data, an evaluation function indicating a region that is a union set of one or more columnar bodies as an evaluation function representing desirability of a positional adjustment result; and
calculate a positional adjustment parameter that optimizes the evaluation function based on the determined rotation axis, the acquired first point cloud data, and the acquired second point cloud data.

2. The measurement device according to claim 1,
Wherein the processor is configured to further execute the instructions to:
calculate a horizontal movement amount relating to point cloud data movement in an axial direction of the rotation axis and a linear movement amount relating to point cloud data movement in a direction perpendicular to the rotation axis.

3. An information processing device comprising:
a memory configured to store instructions; and
a processor configured to execute the instructions to:
receive point group data acquired by each of multiple measurement devices;
retain first point cloud data received from a first measurement device and second point cloud data received from a second measurement device;
determine a rotation axis for positional adjustment;
determine, based on the determined rotation axis, the retained first point cloud data, and the retained second point cloud data, an evaluation function indicating a region that is a union set of one or more columnar bodies as an evaluation function representing desirability of a positional adjustment result; and
calculate a positional adjustment parameter that optimizes the evaluation function based on the determined rotation axis, the retained first point cloud data, and the retained second point cloud data.

4. A position adjustment method comprising:
determining a rotation axis for positional adjustment of first point cloud data and second point cloud data;
determining, based on the rotation axis, the first point cloud data, and the second point cloud data, an evaluation function indicating a region that is a union set of one or more columnar bodies as an evaluation function representing desirability of a positional adjustment result; and
performing a positional adjustment computation for calculating a positional adjustment parameter that optimizes the evaluation function based on the rotation axis, the first point cloud data, and the second point cloud data.

* * * * *